March 9, 1926. 1,576,158
O. TEMPERLI
EXCESS REGISTERING METER
Filed Oct. 30, 1923

Inventor:
Otto Temperli

Patented Mar. 9, 1926.

1,576,158

UNITED STATES PATENT OFFICE.

OTTO TEMPERLI, OF ZUG, SWITZERLAND, ASSIGNOR TO LANDIS & GYR A.-G., OF ZUG, SWITZERLAND.

EXCESS-REGISTERING METER.

Application filed October 30, 1923. Serial No. 671,817.

*To all whom it may concern:*

Be it known that I, OTTO TEMPERLI, a citizen of the Swiss Confederation, residing at Zug, Canton Zug, Switzerland, have made a new and useful Invention Relating to an Excess-Registering Meter, of which the following is a full, clear, and exact description.

It has been proposed to provide excess registering meters, especially those for use with electricity meters, which show on a dial the maximum demand during a given interval of time, with an alarm device, in order to draw the attention of the consumer to the fact that the predetermined limit of current consumption is being exceeded. If the alarm is not observed, or if no means are available to reduce the excess consumption at once, heavy expenses are incurred, as, with the prevailing tariff systems, the consumer must then pay for all the energy consumed in the interval between two meter readings at the higher rate corresponding to the maximum consumption ever reached, i. e. in this case the consumer must also pay at the higher rate for energy taken when his demand was below the maximum limit set. As the time during which an excess of current is taken is, in most cases, very short, and as the average load is generally far below said maximum amount, the said manner of charging is unjust to the consumer.

The object of the present invention is to provide means by which it is possible to charge for the quantity of energy actually used in excess of the maximum demand limit. This object is attained by the use of a tariff counter which is thrown into gear with the driving element of the meter as soon as the demand exceeds the predetermined limit.

One method of construction is shown diagrammatically in the drawings, in which

Figures 1, 2:
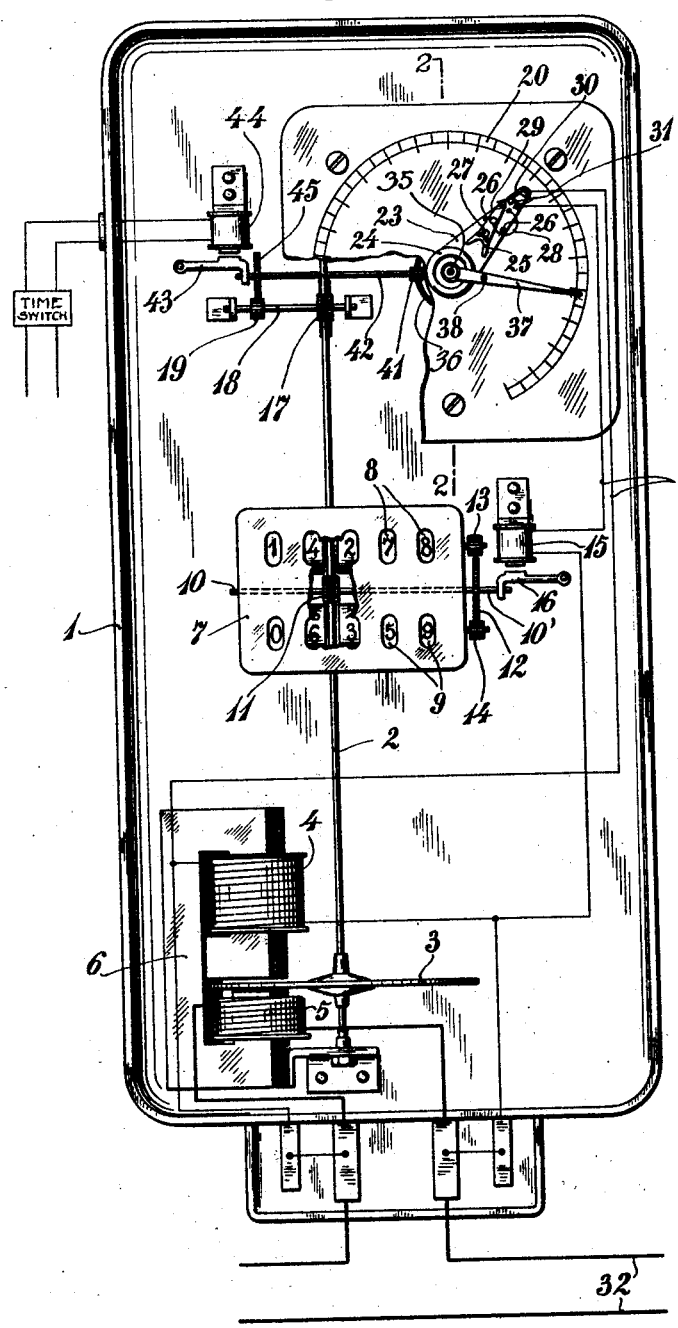
Figure 1 is an elevation of an excess registering meter constructed and arranged in accordance with my invention, with parts removed.
Figure 2 is a vertical sectional view of the same on the plane indicated by the line 2—2 of Figure 1.

On the spindle 2 of a Ferraris electricity meter 1 is fixed a disc 3, running between the pressure coil 4 and the current coil 5 of the iron core 6 well known in electricity meters of the Ferraris type and therefore not particularly described. In the meter 6 a double-tariff-counter 7 is arranged having two integrating trains 8, 9. The spindle 2 is provided with a worm 11 which drives a transverse spindle 10 which is rotatably and movably arranged. The free end 10' of the spindle 10 is linked to the armature 16 of an electromagnet 15; moreover a spur wheel 12 is fastened on this spindle 10 which can be brought into mesh with either of two spur wheels 13, 14 driving the integrating trains 8, 9 registering the energy consumed. Moreover, the spindle 2 is provided with a worm 17 which drives a shaft 18 by means of a worm wheel pinion. On spindle 18 a pinion 19 is fixed meshing with a spur wheel 45 fixed to a spindle 42. The latter is linked at one end to the armature 43 of an electromagnet 44, to the other end a pinion 41 is fixed engaging a toothed gear 36. The gear 36 is fastened to shaft 35 bearing a pointer 37 over a scale 20 fixed to the meter casing by brackets 21. The said pointer is a maximum demand pointer. The shaft 42 is rotatably and movably mounted and may be uncoupled from the meter spindle 2 by means of the electro-magnet 44 working in conjunction with the armature 43 linked to the shaft 42. The maximum demand pointer 37 works on an arm 23 adjustably arranged on a sleeve 22 fixed to the scale 20 concentrically with axis 35. The arm 23 may be fixed by means of a nut 24 at any convenient position. The said switch comprises a double-armed spring actuated lever 25 pivoted on a pin 27 on said arm 23. One arm of said lever 25 is bifurcated, the other arm plays between two stop pins 26 fixed on arm 23. A spring 28 tends to press said lever 25 on either of said stops 26. The free end of lever 25 is provided with a pin 29 which actuates a blade spring 30 carrying one contact piece which works in conjunction with a contact piece 31 fixed to arm 23. Said spring 30 when resting on the fixed piece 31 closes the circuit 33 through the electromagnet 15 which is connected in parallel with the pressure coil 4, in the shunt circuit of the meter 1. The circuit of the electromagnet 44 is opened and closed by means of a clockwork or time switch of any well known type as used with maximum demand indicators, and not shown in the drawing.

The shaft 35 is rotatably mounted in a boss 34 of the casing 1, it carries the toothed gear 36 and the maximum demand pointer 37. The pointer 37 is provided with a pin 38 which cooperates with the bifurcated arm of lever 25. A spiral spring 39 fixed with one end to a lug 40 on said boss 34 and with the other to the gear 36 tends to return the pointer 37 to its initial or zero position with reference to scale 20 after the pointer has been set by the driving elements of the meter. The gear 36 is driven by the pinion 41 as long as the gears 45 and 19 are in mesh, but as soon as electromagnet 44 attracts, the armautre 43 the gears 19, 45 are disengaged and pointer 37 is free to follow the spring 39. As long as the pointer 37 driven by the gears 17, 19, 45, 41 and 36 and by the driving elements 3, 4, 5 of the meter does not pass the maximum determined by the position given to arm 23 the electromagnet 15 is not excited, the switch 30, 31 being open. The spur gear 12 engages pinion 14 and the energy consumed is recorded on the lower counter 9.

If the maximum demand pointer 37 reaches the limit set, its pin 38 strikes against one prong of the bifurcated arm of lever 25. The latter takes part in the movement of the pointer 37, and the spring 28 acting on the lever 25 tilts the latter so that it assumes its end position and abuts against the second stop 26. The spring 30 is released and the switch 30, 31 is closed. The circuit of the electro-magnet 15 is now closed, the armature 16 is attracted and the gear 12 on the spindle 10 is thrown into gear with the pinion 13 and the upper counter 8 records now the energy consumed in excess of the predetermined maximum demand. At the end of the recording period, current passes through electromagnet 44 its armature 43 disengages the gears 45 and 19 and the pointer 37 is returned to its zero position by the spring 39. Upon returning to its zero position, the pointer 37 strikes against the second prong of the bifucrated arm 25 and thereby tilts over the lever 25 into its initial position by means of spring 39. The circuit of the electro-magnet 15 is now broken at 30, 31 and the spindle 10 drops, thus coupling the counter 9 with the spindle 2. In this manner a rapid change-over is effected.

The energy recorded on the counter 9 is charged at a lower rate and that recorded by counter 8 at a higher tariff and the consumer has only to pay the high tariff for that energy which he actually consumed in excess of the limit determined by the position of arm 23.

Having now described my invention and in what manner the same is to be preformed, what I claim is:—

1. In an excess registering meter a spindle mounted for rotation, an element thereon, a core having a pressure coil and a current coil between which the said element is arranged, a pair of counter mechanisms, means to alternately operate said counter mechanisms including a shiftable element, a maximum time pointer, a spring to return the pointer to initial position, means including a shiftable element connecting said spindle to said pointer to cause the latter to be moved by the spindle, electrically operated means to control the last named shiftable element, electrically operated means to control the first named shiftable element and included in open circuit with the pressure coil, and a switch arranged for operation by the said pointer to close said circuit when said pointer reaches a predetermined position.

2. In an excess registering meter a spindle mounted for rotation, an element thereon, a core having a pressure coil and a current coil between which the said element is arranged, a pair of counter mechanisms. means to alternately operate said counter mechanisms including a shiftable element, a maximum time pointer, a spring to return the pointer to initial position, means including a shiftable element connecting said spindle to said pointer to cause the latter to be moved by the spindle, electrically operated means to control the last named shiftable element, electrically operated means to control the first named shiftable element and included in open circuit with the pressure coil, a switch arranged for operation by the said pointer to close said circuit when said pointer reaches a predetermined position, and a shiftable carrier element on which said switch is mounted.

In witness whereof I affix my signature.

OTTO TEMPERLL.